(12) United States Patent
Radke et al.

(10) Patent No.: US 6,732,439 B1
(45) Date of Patent: May 11, 2004

(54) WALL FORM ALIGNING TOOL

(76) Inventors: Larry L. Radke, 15266 Caledonia Rd., Caledonia, IL (US) 61011; Marilyn S. Radke, 15266 Caledonia Rd., Caledonia, IL (US) 61011

( * ) Notice: Subject to any disclaimer, the term of this patent is extended or adjusted under 35 U.S.C. 154(b) by 0 days.

(21) Appl. No.: 10/372,565

(22) Filed: Feb. 25, 2003

(51) Int. Cl.[7] .............................................. G01C 15/00
(52) U.S. Cl. ............................ 33/286; 33/263; 33/299
(58) Field of Search ......................... 33/227, 263, 286, 33/290, 292–297, 299, 611, 645, DIG. 21

(56) References Cited

U.S. PATENT DOCUMENTS

| | | | | |
|---|---|---|---|---|
| 3,057,250 A | * | 10/1962 | Griffith | 33/286 |
| 3,442,016 A | * | 5/1969 | Kaye | 33/293 |
| 4,477,980 A | * | 10/1984 | Jukes | 33/645 |
| 4,709,485 A | * | 12/1987 | Bowman | 33/286 |
| 4,718,171 A | * | 1/1988 | Schlemmer et al. | 33/290 |
| 5,531,031 A | * | 7/1996 | Green | 33/286 |
| 5,604,987 A | * | 2/1997 | Cupp | 33/290 |
| 5,983,510 A | * | 11/1999 | Wu et al. | 33/DIG. 21 |
| 6,087,645 A | * | 7/2000 | Kitajima et al. | 33/DIG. 21 |
| 6,256,895 B1 | * | 7/2001 | Akers | 33/286 |
| 6,598,304 B2 | * | 7/2003 | Akers | 33/286 |

\* cited by examiner

*Primary Examiner*—G. Bradley Bennett

(57) ABSTRACT

A wall form aligning tool includes a tool for determining a straight line along which wall forms may be constructed. Inner wall forms are positioned between a pair of corner wall forms. The device comprises a target attachment for selective attachment to one of the upper edges of the wall forms. A sight attachment is selectively attached to another one of the upper edges. A sight may be removably attached to the sight attachment. The target attachment is positioned on one of the corner wall forms and the sight attachment is positioned on another one of the corner wall forms. The sight is aligned with the panel. The target attachment may be moved along inner wall forms positioned between the corner wall forms such that the inner wall forms may be aligned along a line formed by the sight.

8 Claims, 3 Drawing Sheets

WALL FORM ALIGNING TOOL

BACKGROUND OF THE INVENTION

1. Field of the Invention

The present invention relates to aligning devices and more particularly pertains to a new aligning device that would enable a transit or laser to be securely mounted on a concrete wall form so foundation walls could be properly aligned and corners could be squared.

2. Description of the Prior Art

The use of aligning devices is known in the prior art. U.S. Pat. No. 5,604,987 describes a laser level accessory support. Another type of aligning device is U.S. Pat. No. 5,983,510 describes a three-dimensional laser leveling and angle-calibrating instrument. U.S. Pat. No. 5,531,031 describes a laser level and square for leveling and squaring.

While these devices fulfill their respective, particular objectives and requirements, the need remains for a device that allows a user to easily form corners and straighten walls without climbing up and down out of a hole structured for receiving walls forms, as the present invention can be positioned along the top of the wall forms and moved to the position where needed for continued aligning purposes.

SUMMARY OF THE INVENTION

The present invention meets the needs presented above by eliminating the need for multiple people using tapes or string to check corners around the foundation of a structure.

Another object of the present invention is to provide a new aligning device that would be easy to use, convenient, and accurate, while saving the user time and money.

Still another object of the present invention is to provide a new aligning device that allows a user to place the present invention right on the wall form, eliminating the need for the user to climb up and down out of the hole.

To this end, the present invention generally comprises a tool for determining a straight line along which wall forms may be constructed. Inner wall forms are positioned between a pair of corner wall forms. Each of the wall forms has an upper edge. The device comprises a target attachment for selective attachment to one of the upper edges. A sight attachment is selectively attached to another one of the upper edges such that the sight attachment is substantially horizontally planar with and spaced from the target attachment. A sight may be removably attached to the sight attachment. The target attachment is positioned on one of the corner wall forms and the sight attachment is positioned on another one of the corner wall forms. The sight is aligned with the panel. The target attachment may be moved along inner wall forms positioned between the corner wall forms such that the inner wall forms may be aligned along a line formed by the sight.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE-PREFERRED EMBODIMENT

Figure 1:
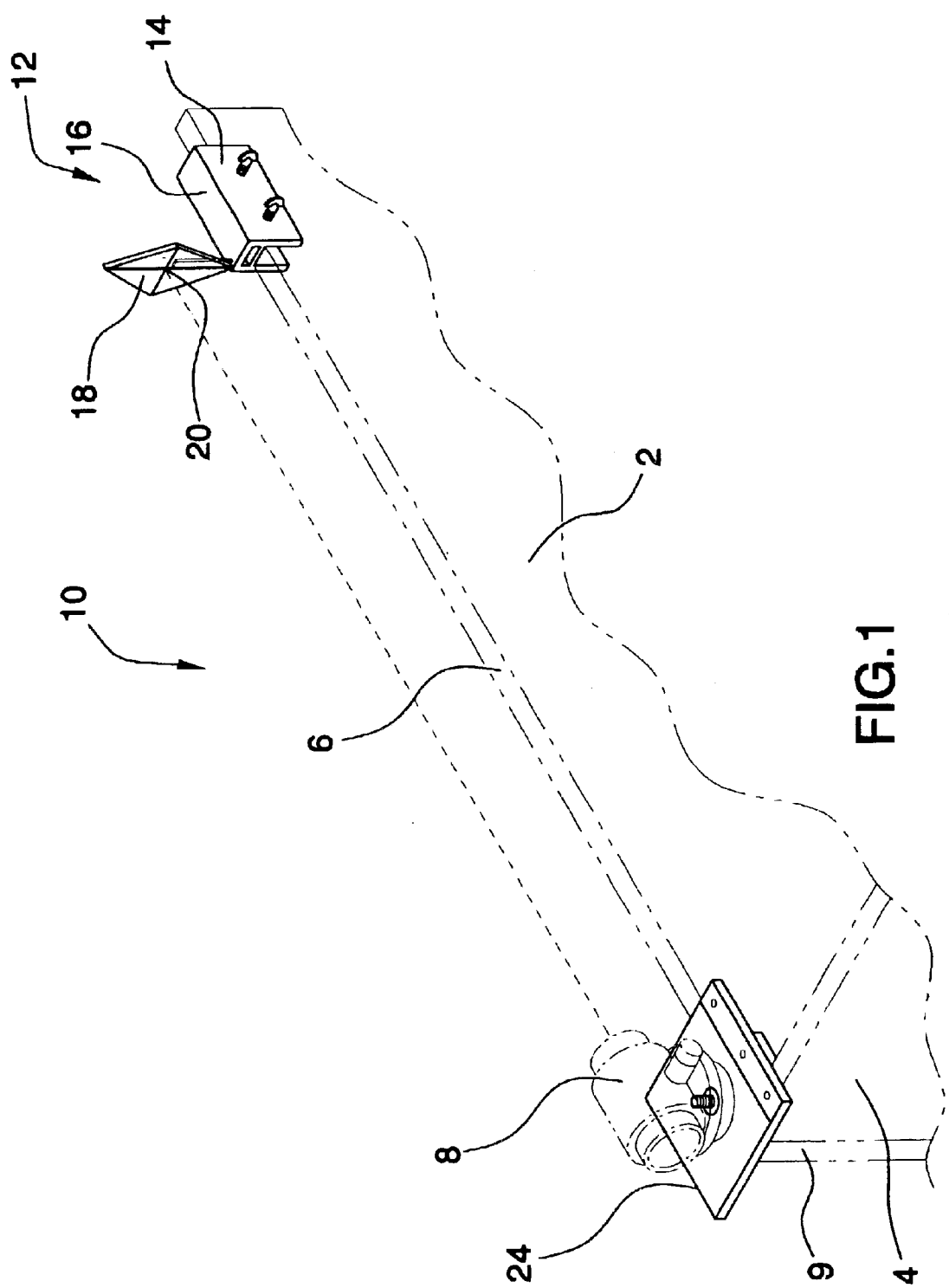
FIG. 1 is a perspective view of a wall form aligning tool according to the present invention.
Figure 2:
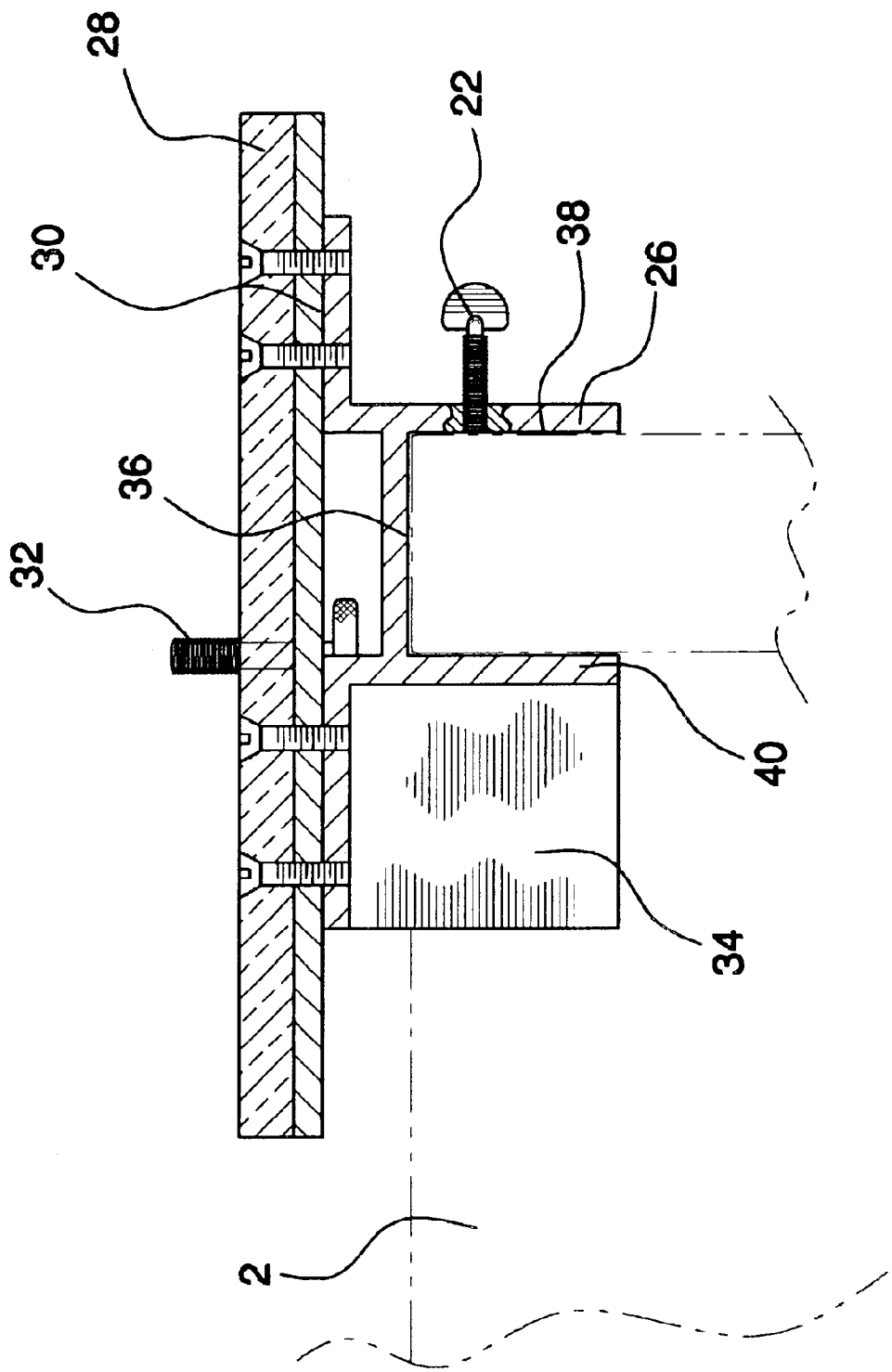
FIG. 2 is a cross-sectional view of the present invention.
Figure 3:
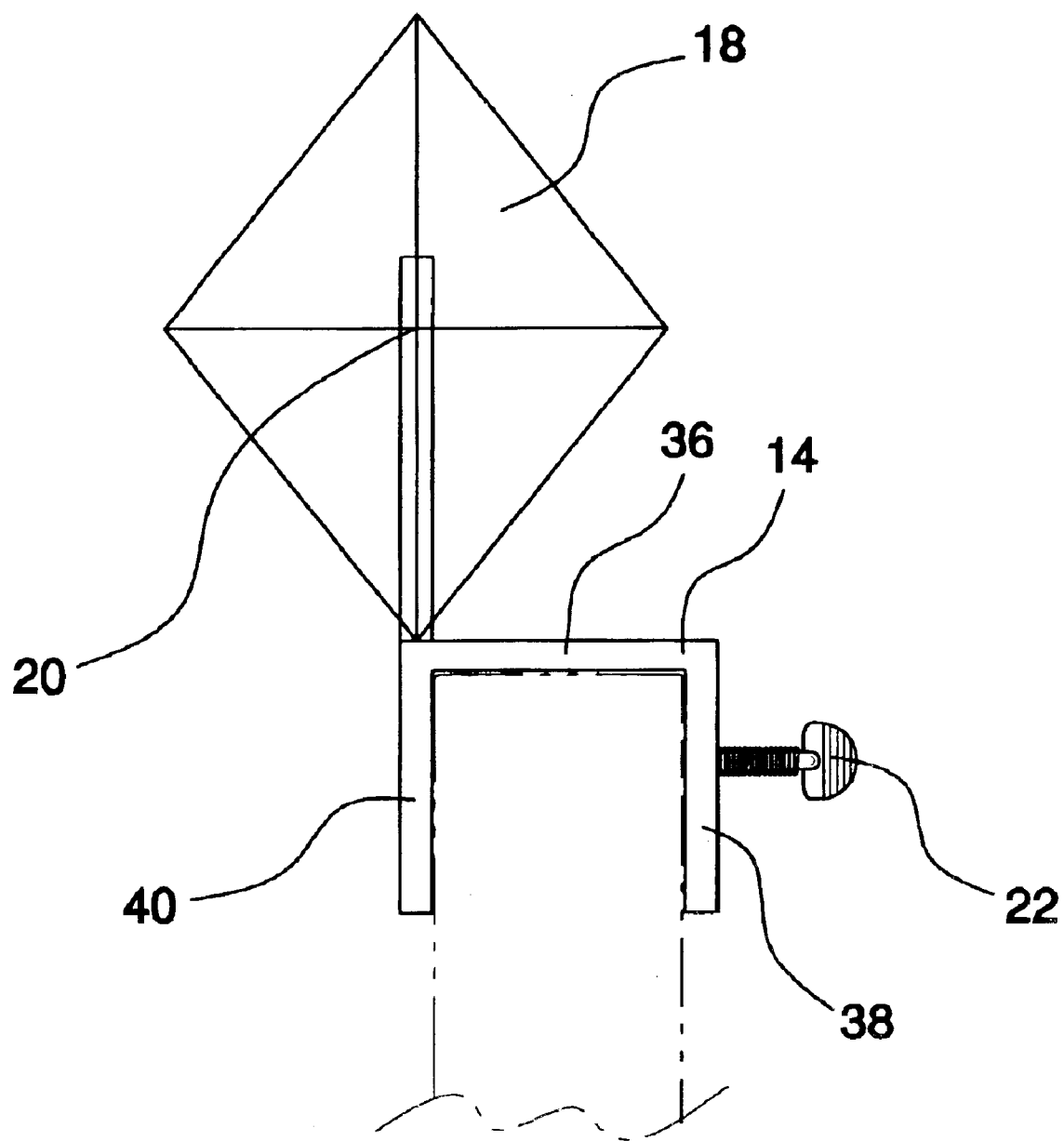
FIG. 3 is a side view of the target attachment of the present invention.

With reference now to the drawings, and in particular to FIGS. 1 through 3 thereof, a new aligning device embodying the principles and concepts of the present invention and generally designated by the reference numeral 10 will be described.

As best illustrated in FIGS. 1 through 3, the wall form aligning tool 10 generally comprises a tool device for determining a straight line along which wall forms 2 may be constructed. Inner wall forms 2 are positionable between a pair of corner wall forms 4 after they have been established. Each of the wall forms 2 has an upper edge 6 upon which the current device may be positioned.

The tool includes a target attachment 12 for selective attachment to one of the upper edges 6. The target attachment 12 includes a coupler 14 for selectively positioning on the upper edge 6. The coupler 14 has an upper surface 16. A panel 18 is attached to and extends upwardly from the upper surface 16. The panel 18 lies in a plane orientated perpendicular to and facing along a length of the top edge when the coupler 14 is positioned on the top edge. The panel 18 preferably has cross hair indicia 20 thereon. Also preferably, the panel 18 is substantially transparent. At least one securing member 22 is adapted for releasably securing the coupler 14 to the wall form 2. The securing member 22 includes a fastener that is threadably coupled to and extends through the coupler 14.

A sight attachment 24 is selectively attached to another one of the upper edges 6 such that the sight attachment 24 is substantially horizontally planar with and spaced from the target attachment 12. The sight attachment 24 includes a fastening member 26 for selectively positioning on the upper edge 6. A plate 28 is attached to a top side 30 of the fastening member 26. A mounting 32 is attached to the plate 28. As in the case of the target attachment 12, at least one securing member 22 is adapted for releasably securing the fastening member 26 to, the wall form 2. The securing member 22 includes a fastener is threadably coupled to and extending through the coupler 14. A sight 8 may be removably attached to the mounting 32. The sight 8 may be a transit or a laser emitting device for sighting the panel 18. Ideally, a corner stabilizer 34 is attached to the fastening member 26. The corner stabilizer 34 is positioned at a juncture of a pair of corner wall forms 4 that meet at a perpendicular angle adjacent to a corner piece 9.

Preferably, the coupler 14 and the fastening member 26 each include U-shaped assemblies having a middle portion 36, an outer leg 38 and an inner leg 40. The outer 38 and inner 40 legs are named with respect to an inner and outer surface of the wall form 2. Ideally, the cross hair 20 and the mounting 32 generally lie within a plane of the respective inner leg 40 for better alignment between the two.

In use, the target attachment 12 is positioned on one of the corner wall forms 4 and the sight attachment 24 is positioned on another one of the corner wall forms 4. The sight 8 is aligned with the panel 18. The target attachment 12 is then moved along inner wall forms 2 positioned between the corner wall forms 4. The wall forms 2 with the target attachment 12 thereon are then adjusted so that the target attachment 12 is aligned with the sight 8. By turning the sight 8 ninety degrees, corners of a room may be positioned for walls that are alternately perpendicular or parallel to the first wall sighted. Since this process, both aligning walls and positioning additional corners, is typically done with strings and multiple persons, the present device is both more efficient and accurate.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tool device for determining a straight line along which wall forms may be constructed, inner wall forms being positionable between a pair of corner wall forms, each of the wall forms having an upper edge, said device comprising:

a target attachment for selectively attaching to one of the upper edges;

a sight attachment for selectively attaching to another one of the upper edges such that said sight attachment is substantially horizontally planar with and spaced from said target attachment, wherein a sight may be removably attached to said sight attachment; and wherein said target attachment is positioned on one of the corner wall forms and said sight attachment is positioned on another one of the corner wall forms and the sight aligned with the panel, wherein said target attachment may be moved along inner wall forms positioned between the corner wall forms such that the inner wall forms may be aligned along a line formed by the sight.

2. The tool device of claim 1, wherein said target attachment includes a coupler for selectively positioning on the upper edge, said coupler having an upper surface, a panel being attached to and extending upwardly from said upper surface, said panel lying in a plane orientated perpendicular to and facing along a length of the top edge when said coupler is positioned on the top edge.

3. The tool device of claim 2, wherein said panel has cross hair indicia thereon.

4. The tool device of claim 2, wherein said panel is substantially transparent.

5. The tool device of claim 2, further including at least one securing member being adapted for releasably securing said coupler to the wall form, said securing member including a fastener being threadably coupled to and extending through said coupler.

6. The tool device of claim 2, wherein said sight attachment includes a fastening member for selectively positioning on the upper edge, a plate being attached to a top side of said fastening member, a mounting being attached to said plate, the sight being selectively attached to said mounting.

7. The tool device of claim 6, further including at least one securing member being adapted for releasably securing said fastening member to the wall form, said securing member including a fastener being threadably coupled to and extending through said coupler.

8. A tool device for determining a straight line along which wall forms may be constructed, inner wall forms being positionable between a pair of corner wall forms, each of the wall forms having an upper edge, said device comprising:

a target attachment for selectively attaching to one of the upper edges, said target attachment including a coupler for selectively positioning on the upper edge, said coupler having an upper surface, a panel being attached to and extending upwardly from said upper surface, said panel lying in a plane orientated perpendicular to and facing along a length of the top edge when said coupler is positioned on the top edge, said panel having cross hair indicia thereon, said panel being substantially transparent, at least one securing member being adapted for releasably securing said coupler to the wall form, said securing member including a fastener being threadably coupled to and extending through said coupler;

a sight attachment for selectively attaching to another one of the upper edges such that said sight attachment is substantially horizontally planar with and spaced from said target attachment, said sight attachment including a fastening member for selectively positioning on the upper edge, a plate being attached to a top side of said fastening member, a mounting being attached to said plate, at least one securing member being adapted for releasably securing said fastening member to the wall form, said securing member including a fastener being threadably coupled to and extending through said coupler, wherein a sight may be removably attached to the mounting; and wherein said target attachment is positioned on one of the corner wall forms and said sight attachment is positioned on another one of the corner wall forms and the sight aligned with the panel, wherein said target attachment may be moved along inner wall forms positioned between the corner wall forms such that the inner wall forms may be aligned along a line formed by the sight.

* * * * *